United States Patent Office 3,278,646
Patented Oct. 11, 1966

3,278,646
HEAT-SEALABLE FILMS COMPRISING POLYOLE-
FIN AND A TERPENE POLYMER
James V. C. Lambert, Jr., Wilmington, Del., assignor to
Hercules Incorporated, a corporation of Delaware
No Drawing. Filed Feb. 1, 1963, Ser. No. 255,698
4 Claims. (Cl. 260—897)

This invention relates to unsupported, heat-sealable films of polyolefins, and, more particularly, to free, self-supporting films of an alloy of polyethylene or stereo-regular polymers of propylene or higher α-olefins and a terpene polymer.

Highly crystalline, high molecular weight polymers of ethylene, propylene, and higher α-olefins are relatively new synthetic polymers that are finding wide acceptance in the plastics art. One of the most promising uses for these new polymers is in the manufacture of oriented film which in turn finds use in the packaging and related arts. In order for these films to enjoy widespread use, however, it is desirable that the film be easily overlap heat-sealed at a temperature which does not destroy the orientation of the film and cause film shrinkage.

One approach which has been made to solve the heat-sealing difficulties of oriented film of these polyolefins is to provide the film with a coating of material that is more heat sensitive and hence heat sealable at a lower temperature than the film itself. This approach has met with difficulties because polyethylene and steroregular polyolefins are unreceptive to the majority of lacquers and similar materials that are normally used as heat-sealable coatings on other films such as films of regenerated cellulose.

While considerable progress has been made in improving the adhesion of heat-sealable coatings to these films, such methods are both cumbersome and expensive. There is a real need, therefore, for means whereby polyethylene and steroregular polyolefin film can be made heat sealable without resorting to a separate coating operation.

Additionally, for certain uses it is desirable that these films have a relatively high modulus. This is an important criterion from the standpoint of appearance in see-through, window-type packaging, and also important from the standpoint of machineability in mechanized packaging.

In accordance with this invention, it has been found that new and very useful overlap heat-sealable films, foils, sheets, ribbons, and other filmlike structures of improved modulus may be prepared from polyethylene and the stereoregular polymers of propylene and higher α-olefins which have been mixed with from about 1 to about 60% of a terpene polymer having a softening point above about 70° C. These films are outstanding because of their clarity, brilliance, higher modulus, and tenacity and improved resistance to gas and moisture transmission. Particularly outstanding is the ability of these films to give strong overlap heat seals with a minimum of shrinkage or loss of film strength.

The mixture of polyolefin and the terpene polymer of this invention from which self-supporting heat-sealable films are prepared are hereinafter termed "alloys" since they are physical mixtures or blends of the terpene polymer distributed through the body of the polyolefin.

The alloys of this invention are readily prepared by conventional methods of mixing and blending employed in the plastics art. For example, stereoregular polypropylene flake or molding powder granules and particles or granules of the terpene polymer may be preliminarily mixed together in a tumbling barrel, or in a Sweetie barrel, or in a ribbon mixer, or the like, and the resulting mixture then intimately blended by malaxating on a hot two-roll mill or in a Banbury mixer, or in the barrel of a heated extruding apparatus to prepare the desired alloy which may then be directly extruded into film, or reduced to suitable granules by conventional comminuting methods for charging to an extrusion apparatus.

Although any polymer of a mono-α-olefin having at least 2 carbon atoms can be employed in this invention, the invention is particularly useful with polyethylene and stereoregular (sometimes called isotactic) polymers of monoolefins having from 3 to 6 carbon atoms including, for instance, polypropylene, poly(butene-1), poly(pentene-1), poly(3-methylbutene-1), and poly(4-methylpentene-1). The polymer can, and normally will, contain ingredients other than those specified in this invention. Such other ingredients include, by way of example, antacids, such as calcium sterate, antioxidants, and heat stabilizers such as alkylated phenols, alkylidene bis(alkyl phenols), terpene phenols, polyhydroxy chromans and alkyl esters of thiodipropionic acid, and light stabilizers such as benzophenone derivatives, and alkyl and aralkyl esters of salicylic acid, nickel phenolates, and the like.

The terpene polymers employed in this invention are the polymeric, resinous materials including the dimers as well as higher polymers obtained by polymerization and/or copolymerization of terpene hydrocarbons such as the alicyclic, monocyclic, and bicyclic monoterpenes and their mixtures, including allo-ocimene, carene, isomerized pinene, pinene, dipentene, terpinene, terpinolene, limonene, turpentine, a terpene cut or fraction, and various other terpenes. Particularly useful starting materials are terpene mixtures containing at least 20% β-pinene and/or limonene or dipentene (racemic limonene), and the "sulfate turpentine" obtained as a by-product in the sulfate pulping process. Typical turpentine compositions from "sulfate" and other sources are shown in the following table:

TABLE 1
[Typical Composition of Turpentines in Weight Percent]

| Component | Gum Turpentine | | | | | Wood Turpentine | | | Sulfate Turpentine | | | |
|---|---|---|---|---|---|---|---|---|---|---|---|---|
| | Southern[1] | Western[2] | Indian[3] | | Honduras[3] | Southern[3] | Western[2] | Mexican[3] | Southern[3] | Western[3] | Northern[3] | Scandinavian[3] |
| | | | P. excelsa | P. longifolia | | | | | | | | |
| α-Pinene | 60–65 | 3 | 89 | 23 | 68 | 75–80 | 8 | 70 | 60 | 34 | 72 | 48 |
| Camphene | | | 4 | | 3 | 4–8 | | 6 | 2 | 2 | 2 | |
| β-Pinene | 25–35 | 30 | 3 | 4 | 5 | 0–2 | 6 | 2 | 20 | 9 | 16 | 6 |
| 3-carene | | 47 | | 65 | | | 70 | 5 | 2 | 33 | 6 | 41 |
| Limonene or Dipentene | | | 1 | | | 0–10 | | 7 | 5 | 7 | 2 | |
| β-Phellandrene | | | | | 13 | | | 2 | | | | |
| Terpinolene | | 3 | | | | | | 4 | | 3 | | |
| Others | 5–8 | 17 | 3 | 8 | 11 | 5–20 | 16 | 4 | 11 | 12 | 2 | 5 |

[1] Encyclopedia of Chemical Technology, vol. 14, The Interscience Encyclopedia, Inc., N.Y., 1955.
[2] N. T. Mirov, Journal of FPRS, February, 1954, pp. 1–7.
[3] Data determined by Hercules Powder Company.

The polymerization of the terpene or mixture of terpenes can be carrier out in known manner with or without solvent and utilizing a known catalyst such as sulfuric acid, phosphoric acid, fuller's earth, boron trifluoride, amphoteric metal chlorides such as zinc chloride or aluminum chloride, and so on. The polymerization is preferably carried out under conditions which cause substantially all of the monoterpenes to react with minimum dimer formation.

While any of the polymers prepared by methods known to the art having average molecular weights of about 500 (Rast) and above and softening points above 70° C. (Hercules, drop) are operable herein, the preferred terpene polymers which are particularly effective in providing the improvements in accordance with the invention are characterized by molecular weights above about 600 (Rast method) and softening points above 100° C. (Hercules, drop).

The amount of terpene polymer that is alloyed with the polyolefin is between about 1% and about 60% by weight of the alloy, preferably between about 3% and about 50%, and more preferably between about 5% and about 40%. An amount below about 1% by weight terpene polymer is generally insufficient to appreciably enhance the heat sealability of film produced from the alloy. Above 60% by weight of the terpene polymer leads to brittle films having poor strength.

Formation of the alloys of this invention into self-supporting films can be readily accomplished by any of the conventional extrusion, casting, or molding procedures well known in the art. For example, films of the alloy may be formed by applying a solution of the alloy in a solvent, as, for example, n-decane, to a hard surface such as glass, metal, etc., evaporating the solvent, and then stripping the film from the substrate. Films of these alloys may be formed without the use of a solvent by spreading the molten alloy on a hard surface and, after cooling, stripping off the film, or the molten alloy may be extruded directly as a flat sheet, or it may be extruded into a tube, blown, and then cut and flattened. Another method of forming films which may be applied to these alloys is to pass the alloy through a pair of rolls, one of which is at a temperature above the softening temperature of the alloy and the other is cold, and then cutting the sheet so formed from the roll.

These films may be used per se or they may be molecularly oriented in one or both directions in the plane of the film whereby higher tensile and impact strengths are obtained. For example, when extruded directly as a flat sheet, quenched, and then drawn below the crystalline melting point of the allow, the drawing will bring about molecular orientation. In the same way, if the alloy is extruded into a tube and then blown below the melting point of the alloy, the latter action will bring about the molecular orientation of the film. If the film is formed by solvent-casting or by spreading the molten alloy on a hard surface, molecular orientation may readily be obtained by elongation of the film. The strength and toughness of melt-cast or melt-extruded films may also be improved by rapid cooling as by means of an air or liquid stream.

As has already been pointed out, overlap heat-sealable, self-supporting oriented films can be formed from the alloys of the polyolefin and the terpene polymer of this invention. This, of course, is an outstanding advantage of these films over oriented films of nonalloyed polyolefins since there is little problem of loss of orientation or shrinkage of film during heat sealing, which is of prime importance in film used for packaging.

Another very outstanding advantage of these films includes the considerably higher modulus (tensile) as compared with oriented films of nonalloyed polyolefins The increase in modulus or stiffness is an important factor in packaging and results in an improvement in machineability. Other advantages include high clarity, sparkle and gloss, improved tenacity, lower gas permeability, lower moisture vapor transmission, and better crease retention.

The general nature of the invention having been set forth, the following examples illustrate some specific embodiments of the invention. It is to be understood, however, that the invention is not limited to the examples since the invention may be practiced by the use of various modifications and changes within the scope of the invention as described herein. In the examples, the physical properties of the films were measured in accordance with the following ASTM test procedures:

Tenacity—D882–58T
Elongation—D882–58T
Modulus—D882–58T
Gas permeability—D1434–58
Moisture vapor transmission rate (MVTR)—E96–53T
Overlap shear strength (heat sealability)—D1002–53T
Dart impact—D1709–59T
Stripping peel strength (T peel)—D903–49

All parts and percentages are by weight unless otherwise specified. The term "RSV" as used herein denotes reduced specific viscosity, which is the specific viscosity divided by concentration of a 0.1% weight/volume solution of polymer in decahydronaphthalene at 135° C.; and the softening point of the polyterpene is that temperature (° C.) at which the polyterpene changes from a rigid to a soft state, as determined by the Hercules drop method (described in Hercules report entitled "The Hercules Drop Method for Determining the Softening Point of Rosins and Modified Rosins," number Her. 400–431C, 1955).

*Example 1*

Seventy-five parts stereoregular polypropylene flake having a birefringent melting point of 167° C. and a reduced specific viscosity of 3.0 and containing 0.4% calcium stearate, 0.25% dilauryl thiodipropionate and 0.1% of the condensation product of one mole crotonaldehyde with 3 moles of 3-methyl-6-t-butylphenol was dry blended by rotating in a baffled drum for 16 hours at room temperature with 25 parts of a polyterpene having a softening point of 125° C. which had been prepared by treating refined sulfate turpentine (Southern) as a 30% solution in toluene with anhydrous $AlCl_3$ at 10–15° C., removing the $AlCl_3$ by washing with aqueous HCl and then with $H_2O$, removing the toluene under reduced pressure, heating at 260° C. with steam sparge for 1 hour, drying, and then topping at 260° C. to remove a portion of the lower polymers and give a polyterpene having the desired softening point. The blend was melt extruded at 400° F. into strands which were chilled and chopped into uniform molding powder granules. This molding powder was then converted into linear oriented film by extruding the molding powder at 450° F. through a die having a 15" by 0.015" slit onto a roll internally cooled with water at 60° F. and rotating at 7 ft./min., and then stretching at 230° F. to 3.5 times its original length using a second cooled roll rotating at 24.5 ft./min., giving a film 0.001" thick. A control film of nonalloyed stereoregular polypropylene flake was similarly melt extruded, reduced to uniform molding powder granules, extruded into flat film, and stretched to 3.5 times its original length. Tensile strength, modulus, elongation, gas permeability, and moisture vapor transmission rate test results for each of the films are recorded in Table 2. The heat-sealing characteristics of both films were determined by running the films in a packaging trial on the FA overwrap machine (a Model #FA packaging machine manufactured by Package Machine Company, East Longmeadow, Massachusetts) and heat-sealing at 290–300° F. Very strong overlap heat seals which gave lap shear strengths over 3 lbs./linear inch (failures were due to film breakage and not seal failure) were formed from the alloy film without loss of orientation or film shrinkage. By contrast, the polypropylene control gave almost zero seal strengths; increasing the sealing temperature gave excessive shrinkage and wrinkling before the control film sealed.

The physical properties and heat seal temperature of the biaxially oriented films were essentially the same as those of Example 4.

TABLE 2

|  | Tensile Strength (p.s.i.) | | Elongation (percent) | | Modulus (p.s.i.) | | Gas Permeability [1] | | MVTR [2] |
|---|---|---|---|---|---|---|---|---|---|
|  | MD | CD | MD | CD | MD | CD | $O^2$ | $CO^2$ |  |
| Example 1 | 20,000 | 4,600 | 50 | 3 | 423,000 | 257,000 | 103 | 330 | 0.46 |
| Control | 18,000 | 4,200 | 90 | Variable | 188,000 | 140,000 | 195 | 540 | 0.54 |

[1] Cc./24 hrs./100 sq. in./atm. based on 1-mil film.
[2] G./24 hrs./100 sq. in. based on 1-mil film.

*Examples 2–5*

Several alloys were prepared from the polypropylene and polyterpene of Example 1 by dry-blending, mixing on a two-roll mill for 6 minutes at 350° F., melt extruding the blends into strands at 400° F., and then chopping into molding powders. The molding powders were then converted into biaxially oriented films 0.8 mil thick by compression molding the powders into sheets at 355° F. and 850 p.s.i. pressure, cooling rapidly, and then biaxially stretching the resulting sheets 4 times in both directions at the temperatures indicated in Table 3, and then cooling rapidly to room temperature. Overlap heat seals were made on each of the films employing a Sentinel Heat Sealer, Model No. 12–12 ASC, with a hot bar dwell time of 2 seconds and a bar pressure of 20 p.s.i. Alloy compositions, physical properties, and heat sealability data of the films, as compared with a control film containing no polyterpene, are recorded in Table 3.

TABLE 3

|  | Control | Example | | | |
|---|---|---|---|---|---|
|  |  | 2 | 3 | 4 | 5 |
| Percent polyterpene in film composition | 0 | 12.5 | 25 | 37.5 | 50 |
| Stretching temperature (° F.) | 295 | 275 | 260 | 250 | 250 |
| Tensile strength (p.s.i.) | 12,300 | 12,200 | 12,000 | 11,600 | 11,200 |
| Modulus (p.s.i.) | 180,000 | 210,000 | 235,000 | 270,000 | 320,000 |
| Dart impact (ft. lbs./mil) | 1.7 | 1.6 | 1.4 | 1.5 | 0.8 |
| Heat seal temperature range (° F.) [1] | 310–315 | 270–290 | 240–280 | 220–245 | 200–220 |
| Film shrinkage (percent) | 25 | 15 | 12 | 9 | 9 |

[1] Temperature required to produce a T-peel seal strength of 100 grams/inch.

The above data demonstrate the advantages of the invention, particularly as regards increased modulus and heat sealability at lower temperature with lower shrinkage.

Biaxially oriented films prepared from these same alloys which had been melt extruded into flat film and run in a packaging trial on the FA overwrap machine gave excellent seals using the alloys of Examples 3–5 at sealing temperatures near the upper limits of the ranges listed in Table 3 for Examples 3–5. Strong seals were obtained with the alloy of Example 2 but some shrinkage occurred. Satisfactory seals were not obtained with the control film.

*Examples 6–10*

The procedure of Examples 2–5 was repeated using 62.5 parts of the polypropylene flake of Example 1 and 37.5 parts of the various polyterpenes listed in Table 4, the polyterpenes being prepared in the manner of Example 1 except as noted.

*Examples 11–16*

The procedure of Examples 2–5 was repeated using the polypropylene flake of Example 1, varying amounts of the polyterpene of Example 1 (softening point 125° C.), and a similarly prepared polyterpene that was not topped (softening point 74° C.) except that the compression molded sheets were not rapidly cooled and oriented into film. Alloy compositions are recorded in Table 5.

TABLE 5

| Composition (percent) | Control | Example | | | | | |
|---|---|---|---|---|---|---|---|
|  |  | 11 | 12 | 13 | 14 | 15 | 16 |
| Polypropylene | 100 | 75 | 50 | 25 | 75 | 50 | 25 |
| Polyterpene softening point 74° C. |  | 25 | 50 | 75 |  |  |  |
| Polyterpene softening point 125° C. |  |  |  |  | 25 | 50 | 75 |

Alloy compositions containing 75% of the polyterpene resin (Examples 13 and 16) were excessively brittle.

*Examples 17–18*

The procedure of Examples 11–16 was repeated using 90 and 75 parts polyethylene instead of polypropylene and 10 and 25 parts, respectively, of the polyterpene of Example 1. The polyethylene had a density of 0.945, an RSV of 3–3.2, and contained 0.05% dilauryl thiodipropionate and 0.014% calcium oxide. The molded sheets gave tensile modulus values of 58,800 and 73,400 p.s.i., respectively, as compared with 48,700 p.s.i. for the control sheets containing no polyterpene.

*Example 19*

The procedure of Examples 2–5 was repeated using 75 parts of the polyethylene of Examples 17–18 and 25 parts TABLE 4
Example

|  | 6 | 7 | 8 | 9 | 10 |
|---|---|---|---|---|---|
| Starting material | Dipentene [1] | β-Pinene [2] | β-pinene [2] | Southern sulfate turpentine [3] | Southern sulfate turpentine [3] |
| Polymerization temperature, ° C. | 40 | 40 | 10–15 | 10–15 | 10–15 |
| Topped | No | No | No | Yes | Yes |
| Softening point (° C.) | 113 | 124 | 146 | 104 | 118 |

[1] Contained 98% dipentene and 2% others.
[2] Contained 86% β-pinene, 7% α-pinene, and 7% others.
[3] Composition given in Table 1.

of the polyterpene of Example 1 except that the molded sheet was stretched to 3.5 times its original length at 230° F. The film had a modulus in the stretching direction about 50% higher than that of a control film and was readily heat-sealed at 170–190° F. with about 10% shrinkage. The control film heat-sealed at about 200° F. with about 20% shrinkage.

*Example 20*

The procedure of Example 1 was repeated except that 97 parts of the polypropylene and 3 parts of the polyterpene were used, the molding powder was extruded at 500° F. onto a cooled roll rotating at 8.8 ft./min., and the stretching was performed at 230° F. to 3.9 times the original length using a second cooled roll rotating at 34.5 ft./min., giving a film 0.0012″ thick. The film, after heat-sealing at 305° F. according to the procedure of Examples 2–5, gave a T-peel strength of 120 grams/inch and a shrinkage of 22% in the stretching direction. By contrast, a polypropylene control film prepared in the same manner gave a T-peel strength of 50 grams/inch and a shrinkage of 22% at 305° F.

What I claim and desire to protect by Letters Patent is:

1. A transparent, heat-sealable, unsupported film consisting essentially of a blend or a polyolefin selected from the group consisting of polyethylene and stereoregular polymers of α-olefins contining from 3 to 6 carbon atoms and a polymer of a terpene selected from the group consisting of allo-ocimene, carene, isomerized pinene, pinene, dipentene, terpinene, terpinolene, limonene, turpentine, and mixtures thereof, said terpene polymer having a softening point above about 70° C., and said blend containing about 1 to about 60% by weight of the terpene polymer.

2. A film according to claim 1 wherein the polyolefin is stereoregular polypropylene.

3. A film according to claim 2 which is oriented along at least one of its axes.

4. A film according to claim 3 which is biaxially oriented.

References Cited by the Examiner
UNITED STATES PATENTS

| 2,453,644 | 11/1948 | Steinkraus | 260—897 |
| 2,975,150 | 3/1961 | Johnson et al. | 260—897 |
| 3,189,584 | 6/1965 | Shearer | 260—897 |
| 3,189,585 | 6/1965 | Shearer | 260—897 |

OTHER REFERENCES

Bain: J. Am. Chem. Soc., 68, pp. 638–641 (1946).

MURRAY TILLMAN, *Primary Examiner.*

DONALD E. CZAJA, *Examiner.*

J. A. KOLASCH, E. B. WOODRUFF,
*Assistant Examiners.*